Figure 1:
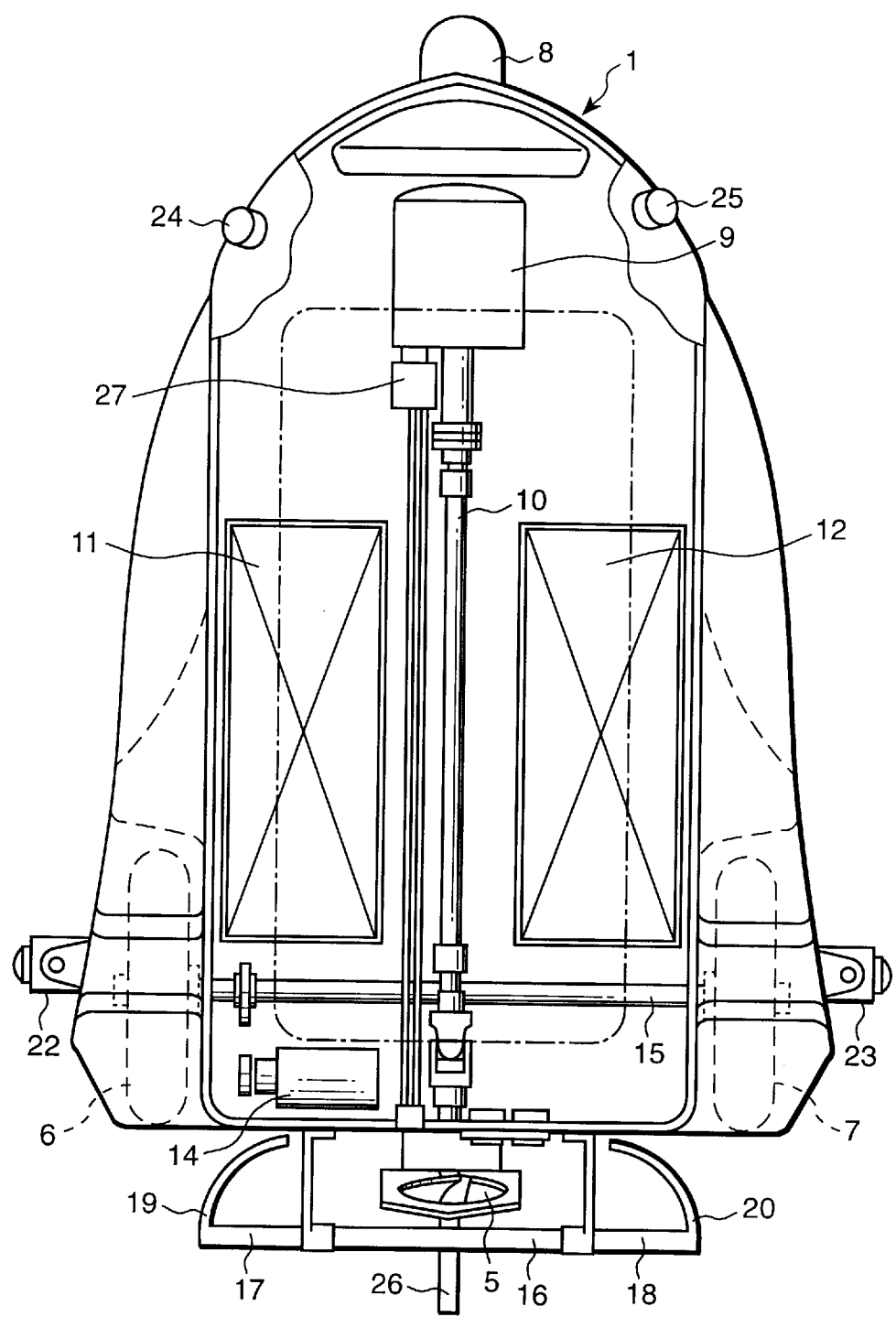

United States Patent

Ortiz-Flotats

[11] Patent Number: 5,769,676
[45] Date of Patent: Jun. 23, 1998

[54] AQUATIC SEARCH DEVICE

[76] Inventor: Antoni Ortiz-Flotats, Ciudad de Elche, 9, 08027 Barcelona, Spain

[21] Appl. No.: 760,314

[22] Filed: Dec. 4, 1996

[30] Foreign Application Priority Data

Dec. 5, 1995 [ES] Spain ..................................... 9503097

[51] Int. Cl.$^6$ ................................................. B63B 22/00
[52] U.S. Cl. .............................................. 441/13; 114/270
[58] Field of Search ................................ 441/80, 82, 83, 441/13; 114/61, 270

[56] References Cited

U.S. PATENT DOCUMENTS 3,026,545 3/1962 Brainard II ................................ 441/80
4,545,315 10/1985 Becherer .................................... 114/61

*Primary Examiner*—Jesus D. Sotelo
*Attorney, Agent, or Firm*—Cushman Darby & Cushman IP Group of Pillsbury Madison & Sutro LLP

[57] ABSTRACT

The device comprises a body which can float in water and, at the same time, has wheels for movement on land, having independent elements for driving the wheels and for movement on the water, and having internal-combustion and electric drive apparatus as well as steering, rescue, remote vision and auxiliary devices, all of the members of the device being operable by remote control both on land and on the water.

8 Claims, 3 Drawing Sheets

AQUATIC SEARCH DEVICE

DESCRIPTION

The present invention is intended to make known an aquatic search device which has considerable features of novelty and inventiveness for the function for which it is intended.

The search device of the present invention is intended basically for movement in both closed and open bodies of water to enable the said bodies of water to be searched by remote control which, above all, enables rescue operations to be carried out quickly, irrespective of the sea state and without additional risk to rescue personnel, an essential advantage which should be noted in the device of the present invention being the speed and safety with which it can act in a rescue operation in comparison with the slow and hazardous action of the personnel assigned to this operation for currently known methods and means.

In order to achieve its objectives, the aquatic search device of the present invention has means for moving it both on land and in the water, for which it has wheels for any movement on land and a screw propeller or water turbine device for moving in the sea, rivers or the like.

The body of the search device is made of a synthetic material in the form of a nautical hull with a keel at the bottom, side and front wheels, a screw propeller and a rear rudder as well as a rear handle for grasping and possibly steering. Internally, the search device has a drive device which selectively drives the rear wheels during movement on land, or the screw propeller or turbine during movement in the water. The wheels are driven by means of a mechanical gear and transmission-shaft assembly, whereas the screw propeller is preferably driven by means of a hydraulic device constituted by a hydraulic pump and a hydraulic motor for driving the propeller or the turbine.

The search device may also possibly be equipped with remote-controlled video cameras in the front portion and at the sides. Various elements of the search device may also be operated remotely. The upper video camera is intended, above all, for observation above the surface of the water and those on the side portions are intended for observing the bed of the water.

The search device is operated by means of an internal-combustion engine or an electric motor, the former having the members necessary for its control, supply, etc. and the electric motor being supplied by means of a system of batteries which, if no internal combustion engine is available, is charged by external means or by included wind-operated or solar-panel means.

The search device of the present invention is operated, for operations in the water, from a position a few meters from the body of water so that the operator of the search device, who is usually situated in an observation seat or in a cabin with a video monitor, puts the drive means of the device into operation by remote control in order to drive the rear wheels, putting the device in the water, at which moment, the drive to the rear wheels is stopped and the turbine or screw propeller means for driving the device in the water are put into operation. The operator manoeuvres the search device at will with the remote control, being able to perform rescue operations, for which the search device has a handle which can easily be grasped by the person in difficulty who can be pulled out of the water quickly and easily. It will also be able to carry floats, etc. The device is put back in the starting position for any new rescue operations by the reversal of the process described.

The device can also be used for land operations since it has means for moving on land and the remote control devices can be used in the same manner as for use in water.

Figure 2:
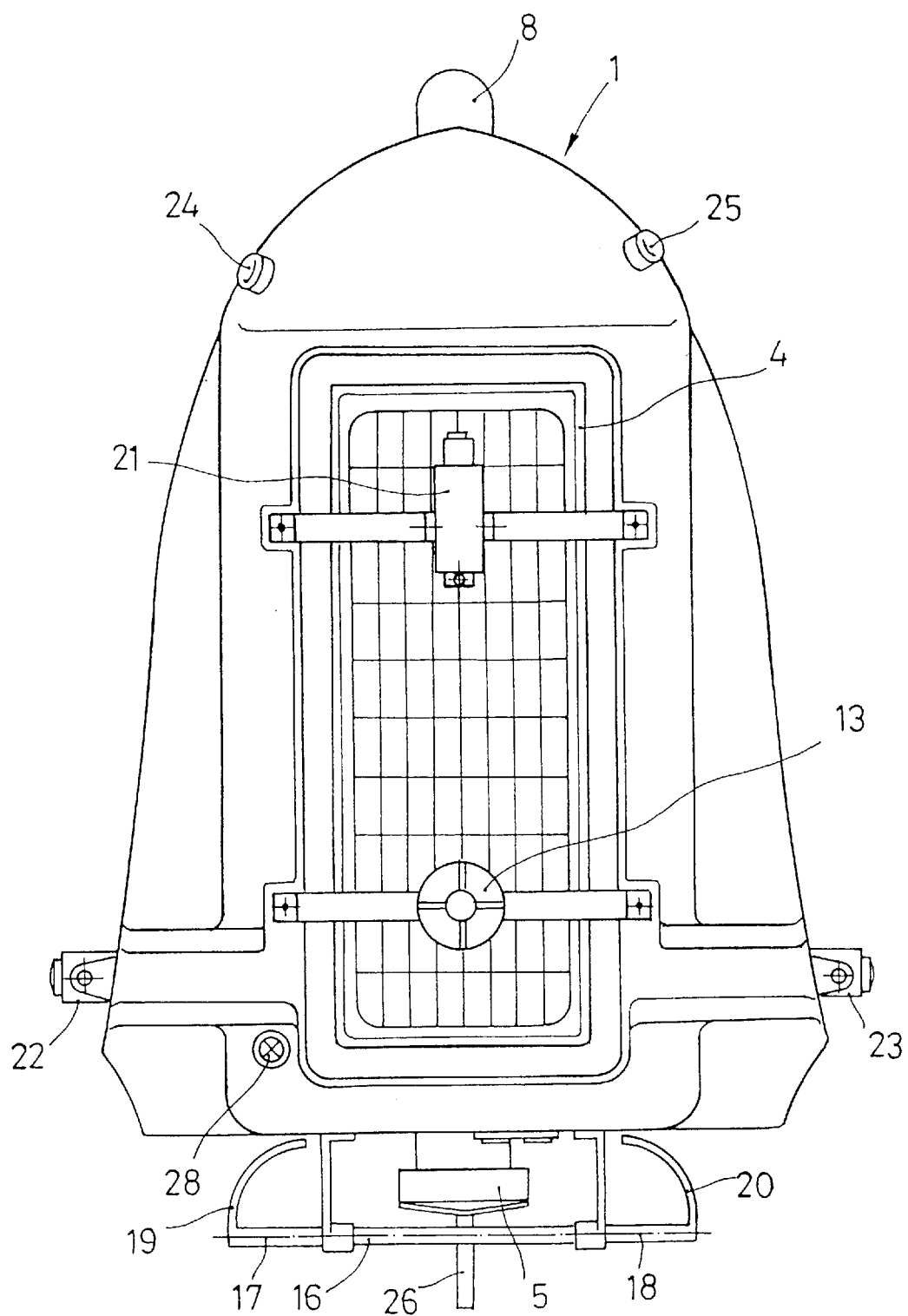
Figure 3:
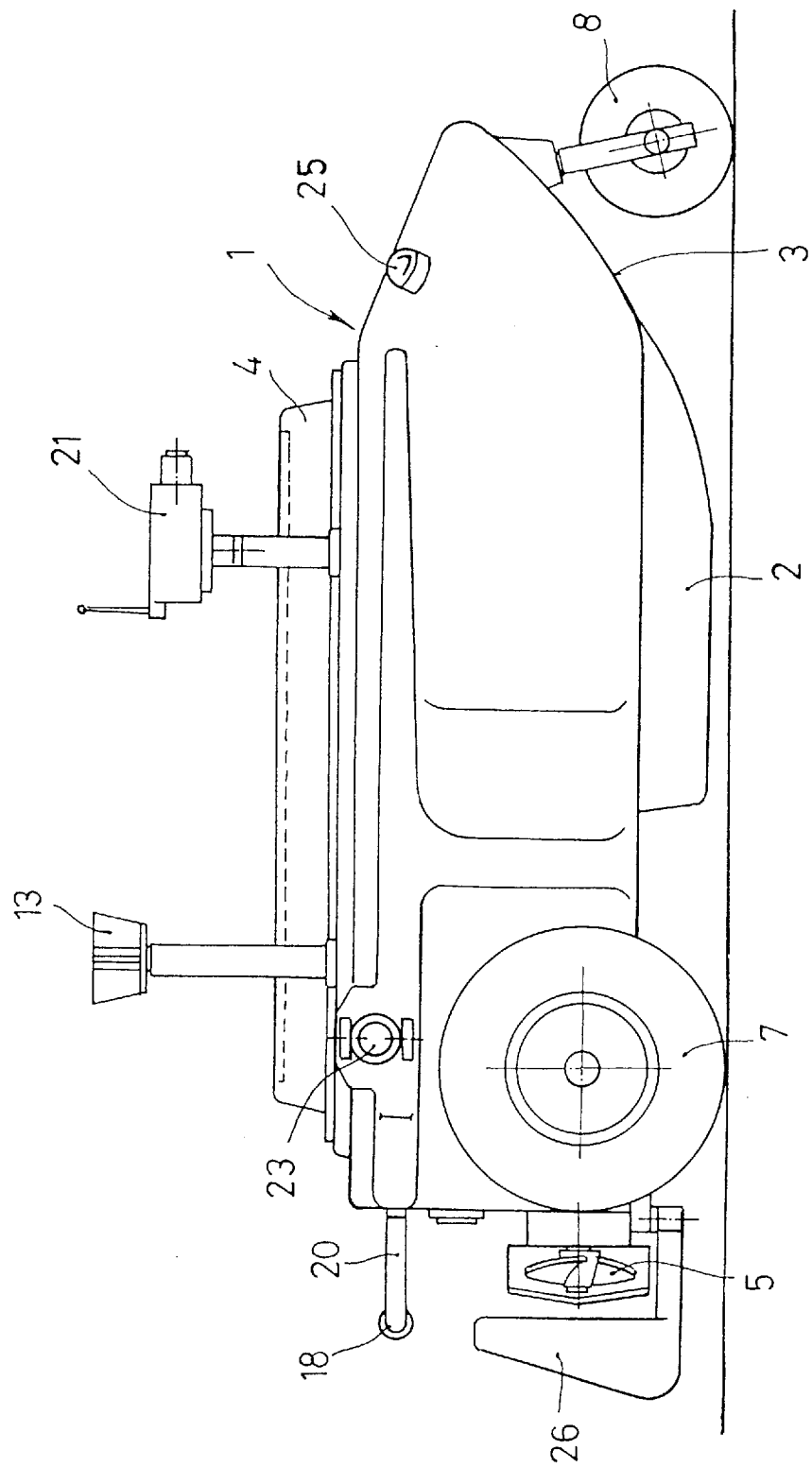

For a better understanding thereof, some explanatory drawings of a aquatic search device formed in accordance with the present invention are appended, by way of example. FIG. 1 is a sectioned plan view of the body of the search device, showing its principal members. FIG. 2 is a plan view of the search device. FIG. 3 is a side elevational view of the aquatic search device of the present invention.

The aquatic search device of the present invention comprises, basically, a moulded body 1 which has a keel 2 at the bottom, FIG. 3, and a sloping bow portion 3, the hollow interior of the body being closed by an upper cover 4 and having, as is usual, a rear drive screw propeller 5 or drive turbine and also having a rear rudder 26 and wheels for movement on land, such as the rear wheels 6 and 7 and the front wheel 8.

The screw propeller or, alternatively, the turbine, is driven by a drive means 9 which may be a petrol or diesel internal-combustion engine or an electric motor. For driving a propeller, an intermediate transmission shaft 10 is provided and, if desired, drives a turbine for expelling water through the stern of the aquatic search device. A hydraulic pump 27 may also be provided for driving the propeller or other members hydraulically.

For electric drive, large-capacity batteries 11 and 12 are provided and may be charged by an electrical generator driven by the internal-combustion engine 9 or supplied by means of a wind-operated device 13, a solar panel, or other similar device.

The rear wheels 6 and 7 are driven by the electric or hydraulic motor 14 and an intermediate sprocket-and-chain system, shown schematically in FIG. 1, for driving the axle 15 of the rear wheels.

The search device has a rear transverse grasping bar 16 and further side handles 17 and 18 with curved protection elements 19 and 20. The handles can be grasped by the person to be aided, possibly with the help of any floats or other similar means provided. The search device may possibly be accompanied by a diver who collaborates in rescue operations although, in many cases, the search device will be used autonomously, manipulated by remote control.

One of the items with which this aquatic search device is equipped consists of a remotely controlled video camera 21 on the upper portion and a further two cameras 22 and 23 which can swing sideways and can be controlled remotely.

Infra-red lights 24 and 25, also controlled remotely, are also provided at the front.

A siren 28 may also be operated by remote control.

With the arrangement mentioned, the aquatic search device of the present invention can perform its functions of movement on water or on land effectively, being controllable remotely for multiple control and drive functions by remote devices.

I claim:

1. Aquatic search device comprising:
   a body which can float in water and has wheels for movement on land,
   said body having independent means for driving the wheels and for movement in water, and having one of internal-combustion and electric drive means, as well as steering means, rescue means, remote vision means and auxiliary means, all of said means being operable by remote control both on land and in the water.

2. Aquatic search device according to claim 1, including video cameras in an upper front portion of a hull and on rear side portions, all of the cameras being operated by remove control and rear cameras being able to swing on vertical shafts.

3. Aquatic search device according to claim 1, wherein the search device has remote-controlled infra-red lights on its front portion.

4. Aquatic search device according to claim 1, including a remotely operable acoustic alarm in the body of the search device.

5. Aquatic search device according to claim 1, including large-capacity batteries incorporated in the interior of the body of the search device.

6. Aquatic search device according to claims 5 wherein said batteries are supplied from the exterior.

7. Aquatic search device according to claim 5 wherein said batteries are supplied by an autonomous charging device including at least one of a wind-operated charging device and a panel of photovoltaic solar cells.

8. Aquatic search device according to claim 1, wherein:

said body is moulded and has a bottom keel, said means for movement in water includes one of a driving screw propeller and turbine, a hydraulic pump, a first motor coupled to said hydraulic pump and to said one of a driving screw propeller and turbine, a second motor, which is one of a hydraulic motor and an electric motor, said means for driving the wheels including said second motor and a sprocket and chain set intermediate said second motor and wheels, a transverse rear axle having said wheels connected thereto, and a front wheel.

* * * * *